(12) United States Patent
Sewell et al.

(10) Patent No.: US 12,158,396 B2
(45) Date of Patent: Dec. 3, 2024

(54) ULTRASONIC LEAK DETECTOR AND METHOD OF ULTRASONIC LEAK DETECTION

(71) Applicant: PROSARIS SOLUTIONS, Halifax (CA)

(72) Inventors: Colin Sewell, Halifax (CA); Scott Hurst, Halifax (CA)

(73) Assignee: PROSARIS SOLUTIONS, Halifax (CA)

( * ) Notice: Subject to any disclaimer, the term of this patent is extended or adjusted under 35 U.S.C. 154(b) by 232 days.

(21) Appl. No.: 17/765,909

(22) PCT Filed: Oct. 1, 2020

(86) PCT No.: PCT/CA2020/051317
§ 371 (c)(1),
(2) Date: Apr. 1, 2022

(87) PCT Pub. No.: WO2021/062547
PCT Pub. Date: Apr. 8, 2021

(65) Prior Publication Data
US 2022/0412835 A1    Dec. 29, 2022

Related U.S. Application Data

(60) Provisional application No. 62/908,907, filed on Oct. 1, 2019.

(51) Int. Cl.
*G01M 3/24*    (2006.01)
*G01S 3/808*    (2006.01)

(52) U.S. Cl.
CPC .............. *G01M 3/24* (2013.01); *G01S 3/8083* (2013.01)

(58) Field of Classification Search
CPC .............................. G01M 3/24; G01S 3/8083
See application file for complete search history.

(56) References Cited

U.S. PATENT DOCUMENTS

| | | | |
|---|---|---|---|
| 9,995,647 B2* | 6/2018 | Huseynov | G01M 3/24 |
| 2017/0089800 A1 | 3/2017 | Huseynov et al. | |
| 2018/0333135 A1* | 11/2018 | Kim | G01S 15/899 |
| 2019/0139552 A1 | 5/2019 | Kim et al. | |
| 2019/0261108 A1* | 8/2019 | Saksela | G01H 3/125 |
| 2022/0412835 A1* | 12/2022 | Sewell | G01S 3/801 |

FOREIGN PATENT DOCUMENTS

| WO | 02066950 A1 | 8/2002 |
|---|---|---|
| WO | 2018056214 A1 | 3/2018 |

OTHER PUBLICATIONS

Supplementary European Search Report for European Application No. 20872138.1 mailed Oct. 13, 2023.

* cited by examiner

*Primary Examiner* — Eric S. McCall
(74) *Attorney, Agent, or Firm* — Carlson, Gaskey & Olds, P.C.

(57) ABSTRACT

A system and method of ultrasonic acoustic source location is provided. The method comprises receiving an ultrasonic acoustic signals at an ultrasonic detector having a multiple arrays. Each array comprising multiple transducers. The acoustic signals are pre-processed to triangulate a location of a source. Sensor data of a mobile device is associated with the determined location; and identify a location of the source on a display of the mobile device. The ultrasonic leak detector provides improved accuracy and performance efficiencies over traditional solutions.

17 Claims, 13 Drawing Sheets

2D Far-Field Geometry

3D Localization with 3 Sensors

ULTRASONIC LEAK DETECTOR AND METHOD OF ULTRASONIC LEAK DETECTION

CROSS-REFERENCE TO RELATED APPLICATIONS

The present application claims priority to United States Provisional Application No. 62/908,907 filed Oct. 1, 2019 the entirety of which is incorporated by reference for all purposes.

TECHNICAL FIELD

The present disclosure relates to ultrasonic detectors and in particular to an ultrasonic leak detector such as ultrasonic gas leak detectors (UGLD) for detecting gas leaks and ultrasonic sound detectors (USD) for detecting corona discharge on extra-high voltage (EHV) transmission system insulators.

BACKGROUND

When a leak occurs in a system such as a pipeline the escaping gas emits high-frequency sounds which cannot be easily identified by human hearing. Pipeline leak detection system have been used to determine if a leak has occurred in systems which contain liquids and gases. Ultrasonic detectors have been utilized to aid in the identification of leaks in the delivery of liquids and gases but have been cumbersome and expensive limiting their usage and application. In the example of a pipeline, using an UGLD will maintain the integrity of the pipeline to ensure safe and effective delivery. Additional methods of detection that may be utilized include hydrostatic testing, infrared, and laser technology after pipeline erection and leak detection during service. Similarly motors may generate a corona discharge which can be detected as sound to identify a malfunction.

An acoustic camera or detection device is used to locate sound sources such as leaks that emit high frequency noise and to characterize them such as for example gas system or electrical discharges in real-time. The acoustic camera typically consists of a group of microphones, also called a microphone array, from which signals are simultaneously collected and processed to form a representation of the location of the sound sources. An example of a real-time ultrasound imaging device is the DISTRAN™ Ultra M real-time "acoustic camera" leak detector. DISTRAN uses phased array sensors along with frequency filtering to discriminate between sources of sound that do not represent leaks and those that do. The large array utilizes a pseudo-random distribution of sensor pairs to facilitate source discrimination and are limited to identifying a location from the detector. The ability to easily and effectively locate a leak or noise source increases the reliability and safety of industrial systems however, the usage of existing systems has been limited by the cost, size and complexity and lack of features.

Accordingly, systems and methods that enable improved ultrasonic detectors remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1A:
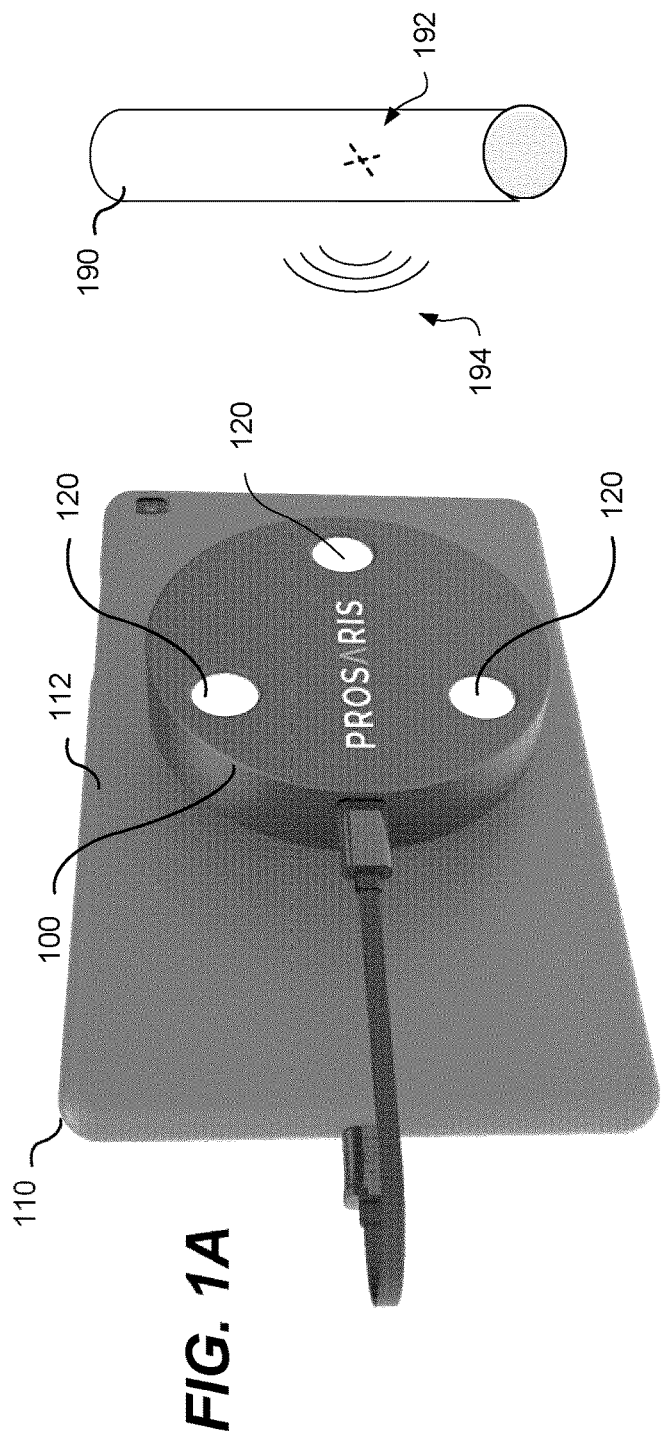
FIG. 1A shows a representation of an ultrasonic detector coupled to a mobile device.

Embodiments are described below, by way of example only, with reference to FIGS. 1-16

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an a body including: a first surface for coupling to a mobile device, a second planar surface directed away from the mobile device. The ultrasonic detector also includes a plurality of ultrasonic arrays provided on the second planar surface each associated with one of the plurality of equidistant openings; a processor for receiving an ultrasonic acoustic signal from each of the plurality of ultrasonic arrays, and an interface for providing a pre-processed signal from the ultrasonic detector to a mobile device for further processing on the mobile device to identify a location of a source. Other embodiments of this aspect include corresponding computer systems, apparatus, and computer programs recorded on one or more computer storage devices, each configured to perform the actions of the methods.

One general aspect includes a method of ultrasonic acoustic source location. The method of ultrasonic acoustic source location also includes receiving a plurality of ultrasonic acoustic signals at a plurality of arrays of an ultrasonic detector; pre-processing the plurality of ultrasonic acoustic signals by one or more processors of the ultrasonic detector, determining a location from the pre-processed plurality of acoustic signals, associating sensor data of a mobile device with the determined location, and identifying a location of the source on a display of the mobile device. Other embodiments of this aspect include corresponding computer systems, apparatus, and computer programs recorded on one or more computer storage devices, each configured to perform the actions of the methods.

The leak detector described provide an solution for detecting and pinpointing gas leaks and corona discharges with improved accuracy and efficiency. The dedicated preprocessing of acoustic signals by the ultrasonic detector provided by an ultrasonic array provides higher accuracy. Each array has multiple transducers providing triangulation between the array and transducers. The pre-processed signals are then provided to a mobile device which can utilized location sensors of the mobile device in addition to a camera to provide a visual identifier of where the source is located in front of and within three-dimensional space. By leveraging dedicated pre-processing of acoustic signals in addition to the processing by the mobile device a compact and efficiently solution is achieved not previously possible.

As shown in FIG. 1A an ultrasonic detector 100 such as a UGLD or USD depicted in a circular configuration connects to the back of a mobile device 110 which serves as the system host and which provides the link to related, cloud-based data services. The ultrasonic detector 100 provides a body which can be coupled to a mobile device 110. The body 100 has a generally planar first surface 126 which makes contact with the back surface of the mobile device 112 to which it can be affixed. The body 100 is positioned so that a camera of the mobile device 110 is not obstructed to allow mapping between a detected source and a capture image or video of the surrounding area. A second surface 124 facing away from the mobile device directs ultrasonic sensors towards a detection area to identify an ultrasonic source. The ultrasonic detector utilizes multiple arrays of ultrasonic sensors arranged on the receiver face in an equidistant, circular pattern, which is known as radial symmetry. The leak detector 100 may utilize a physical retention mechanism, an adhesive or magnetic coupling. Alternatively, the leak detector 100 may integrate mobile device processing elements.

Figure 1B:
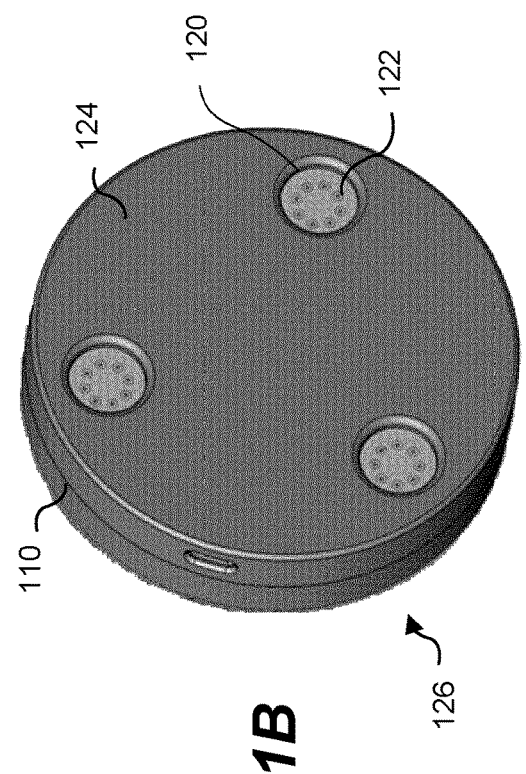
FIG. 1B shows a perspective view of the ultrasonic detector show sensors of each cluster.

FIGS. 1A and 1B show representations of the ultrasonic detector 100 with 3 array clusters 120 where a single opening in the receiver represents a single cluster 120 comprising multiple sensors provided by ultrasonic transducers to detect ultrasonic acoustic signals emanating from a source such as a leak. The formation of the clusters is based on the required frequency detection and location discrimination ability. The general concept is that each cluster 120 determines a vector and possibly distance to the source 192 of ultrasonic sound emitting 194 for example from a gas pipe 190 or corona discharge from a motor for example. Each vector is based at the cluster center 120, which is determined by physical geometry and it's position in three-dimensional (3D) space as determined by the use of additional sensors, which include but are not limited to: accelerometers, gyros, range sensors and GPS built-in to the system and/or augmented by the host device. As shown in FIG. 1B each cluster 120 comprises multiple sensors, in this example 8 sensors 122.

Figure 16:
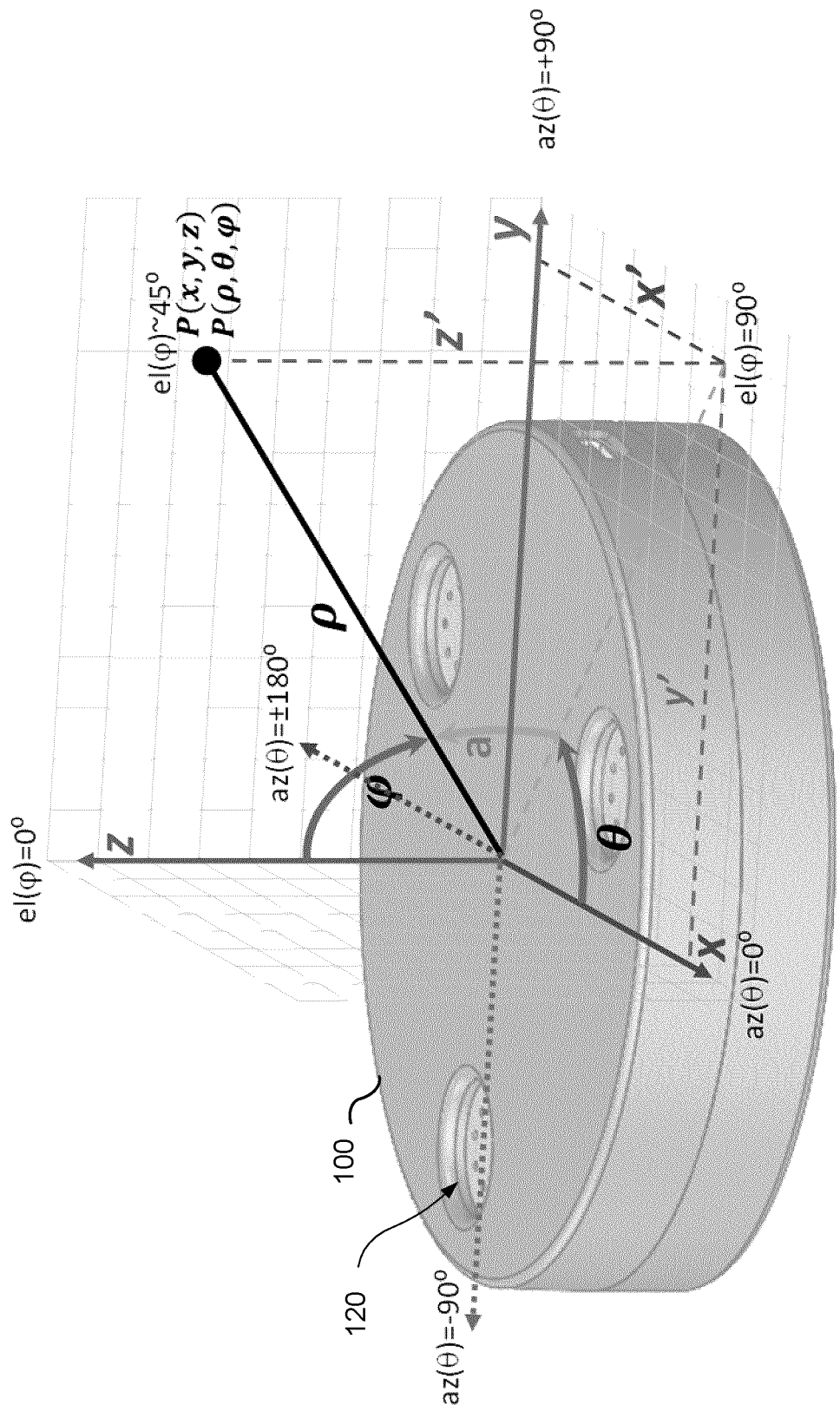
FIG. 16 shows a representation of the ultrasonic leak detector approach to acoustic location algorithms to determine the direction to the source of a leak as an azimuth ($\vartheta$) and elevation ($\varphi$) pair.

Embedded system software on the leak detector 100 employs acoustic location algorithms to determine the direction to the source of a leak as an azimuth ($\theta$) and elevation ($\varphi$) pair as depicted in FIG. 16. These vectors identify the direction of prominent frequencies of interest within the "field of view" of the device. The host application (Android™/iOS™) monitors the acoustic environment over space and (limited) time to identify frequency content that is considered noise so these frequencies may be adaptively filtered by the device. This aids in directionality and forms the basis for the patent protection requirements.

Better results can be obtained with more clusters or if the vector information also includes distance. However, this is limited by physical constraints, which include minimizing the size of the device, which in turn limits the printed circuit board (PCB) surface area on which components may be installed as well as computational or processing capability of the system. Mathematically complex processes, such as the digital signal processing (DSP) necessary for this exercise require considerable computational resources. Determining distance accurately on an acoustic only sensing device of the present scale will be difficult without the use of disclosed range sensing devices.

Advanced acoustic location methods, which provide enhancements over basic directionality and include distance to the source, are characterized as "3D Sound Localization". The described leak detector identifies the distance to leaks as well as the direction.

Although the description is presented in relation to a leak detector, the technology may be utilized for detecting corona discharge or motor performance issues. The ultrasonic detector may also be applicable to other noise detection applications, for example the characterization and detection of potential failure of industrial motors. For example the detector could be applied to rotating machinery (motors & pumps) for identifying potential problems for Predictive Maintenance (PM) purposes. For example, data collected at customers sites for specific equipment would be analyzed and compared to the manufacture's data to identify when lubrication is necessary and even when catastrophic failure may be imminent.

Figure 2A:
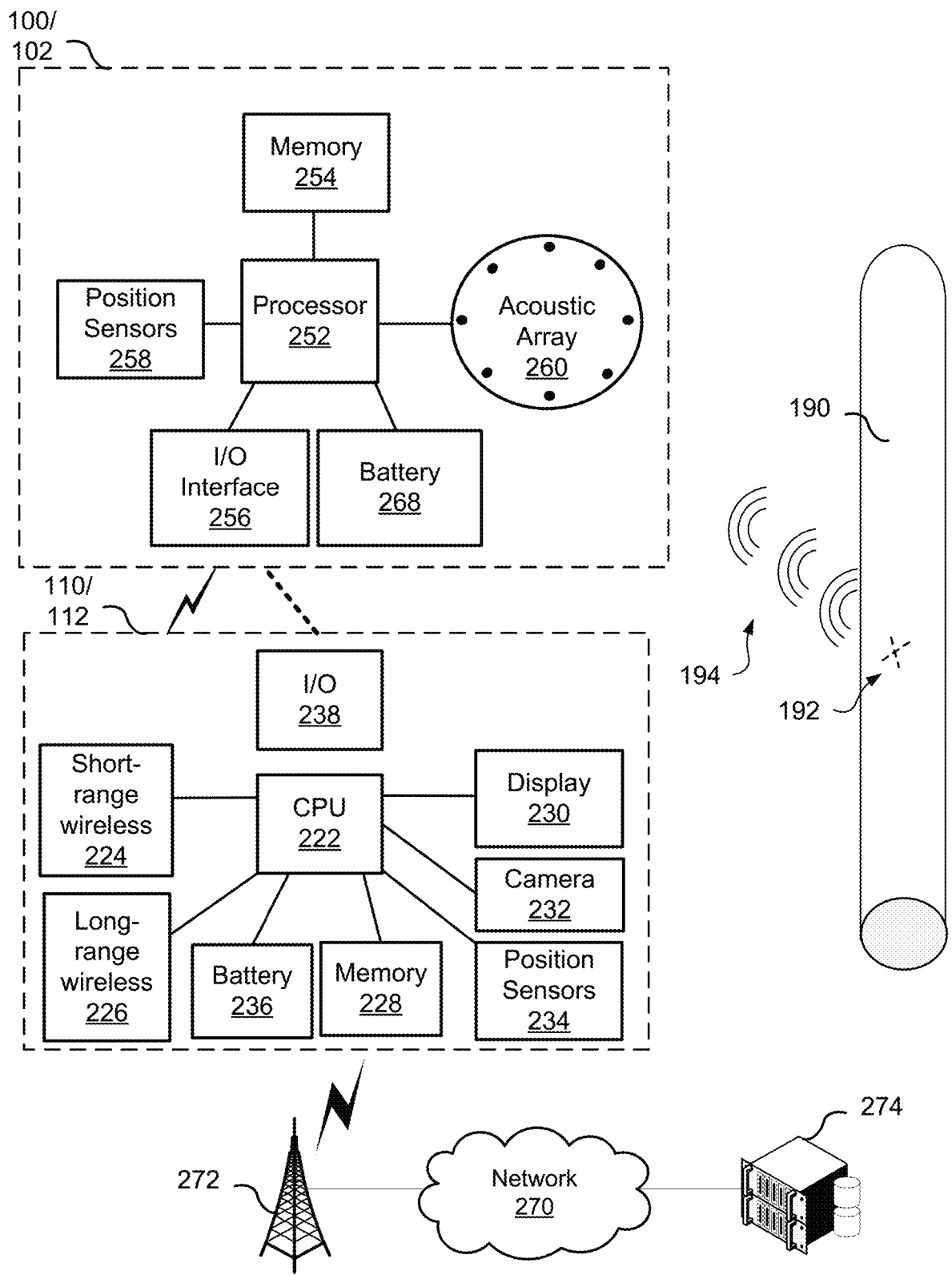
FIG. 2A shows a system representation of an ultrasonic detector processing block.

FIG. 2A shows a system representation of an ultrasonic leak detector 100 and a handheld mobile device 110. The leak detector 100 comprises a system of distributed processor(s) 252 which may include a combination of digital signal processor (DSP), field programmable gate array (FPGA), application specific integrated circuit (ASIC), multi or single core general-purpose processor (GPP), system-on-a-chip (SOC) or Knowledge Processing Unit (KPU) depending on the processing requirements of the leak detector 100. KPU's or Neural Network Processors (NNP) may be used to significantly improve the performance of Time Delay Estimation (TDE) algorithms.

Figure 2B:
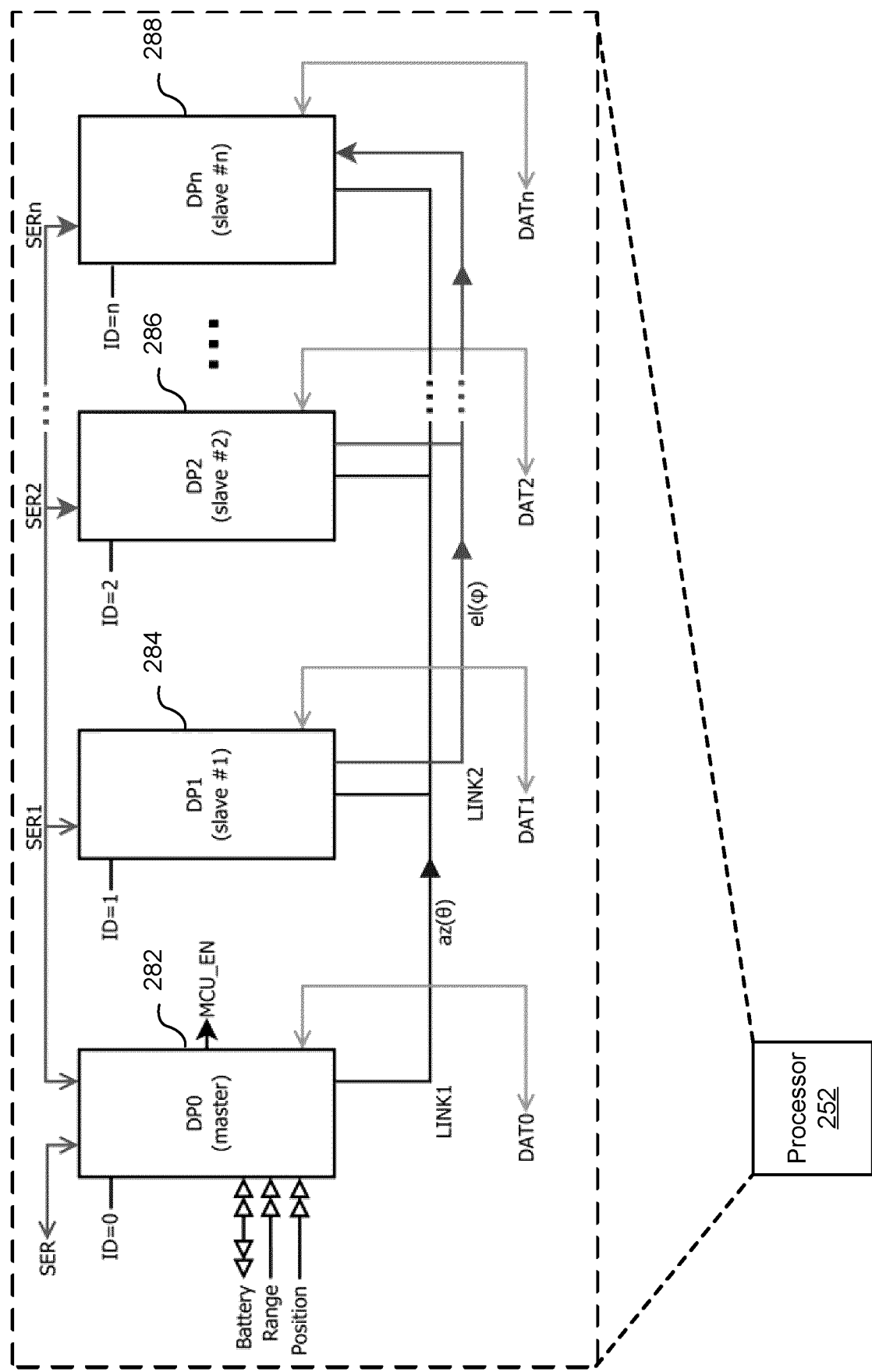
FIG. 2B shows a further view of the ultrasonic processor configuration

With reference to FIG. 2B, the processor(s) 252 can comprise multiple distributed processors (DP) 282, 284, 286, 288. Each DP node 282, 284, 286, 288 is responsible for a different task. One determines azimuth ($\theta$), another determines elevation ($\varphi$), another provides an indication of when the leak is directly ahead and centered on the receiver (on-target). When "on-target", additional sensors provide a direct measurement of the distance to the target source. The detection node arrays may then be "steered" in a particular direction of interest to capture sound in that direction for subsequent processing, which includes frequency analysis (FFT), noise filtering, Sound Pressure Level (SPL) and mass-flow determination. Working together the DP nodes 282, 284, 286, 288 may also provide "triangulation" capability to augment sensor based range sensing capabilities for "off-target" conditions. Each processor 252 is coupled to one or more clusters 120 in an acoustic array 260 which attaches to an external portion of the mobile device 100.

The leak detector 100 also contains a memory 254 coupled to the processor which provides program instructions and work space for processing data received from the acoustic array 260. This program determines the location of a leak 192 of gas from a pipe or other source 190 which emits high-frequency acoustic noise 194. A rechargeable battery 268 interfaces with the processor 252 and may be recharged with a direct or inductive connection to the mobile device 110. An input output interface (I/O) 256 can provide a wireless data connection to the mobile device 110 through near field communication (NFC), a personal area network (PAN) connection such as Bluetooth™ or a local area connection (LAN) such as Wi-Fi™. Alternatively, a direct wired connection may be provided by the I/O interface 256 to the mobile device 110 I/O 238 over an interface such as USB. In addition, the leak detector 100 will have one or more position sensors 258 such as for example a global positioning system (GPS) receiver, accelerometers, lasers, infrared emitters/detectors, and cameras. The data received from the acoustic array 260 is pre-processed to determine direction vectors and, along with positional data, is transferred from the leak detector 100 to the mobile device 110. The mobile device 110 receives the data via the short-range wireless 224 or USB interface and contains one or more central processing units (CPU) 222 which executes instructions contained in memory 228 and powered by battery 236. The received data may be further processed by the CPU 222 and transmitted via a long range wireless interface 226 such as 3G, 4G LTE, and 5G wireless networks 272 coupled to a network 270 or plurality of networks associated with remote processing systems 274. A local area network interface may alternatively be used to transmit the data when possible. A camera 232 in addition to position sensors 234, such as an accelerometer may be utilized in conjunction with or independently from the leak detector sensors, to generate an image on the display 230 identifying the determined location. The remote processing systems 274 provide archiving and mining of aggregate data for enhanced data services.

The leak detector may alternatively be used in a distributed receiver environment. For example a number of receiver/detectors may be placed at each corner of an equipment room with data generated by each device sent to and processed by a central node. This data may then be used to continuously identify problem locations within the facility with a high degree of reliability and accuracy.

The mobile device 110 can provide additional signal conditioning in the frequency domain. The host application (Android™/iOS™) monitors the acoustic environment over space and (limited) time to identify frequency content that is considered noise so these frequencies may be adaptively filtered by the device.

The beam-formed and filtered acoustic signal can be encoded in a digital audio format such as for example MP3, WAV, AIFF, AU, AAC, FLAC, WMA, etc. This provides a practical way to store raw, filtered acoustic data along with the digital interpretation so that machine learning systems will have a consistent dataset to work with.

Figure 3:
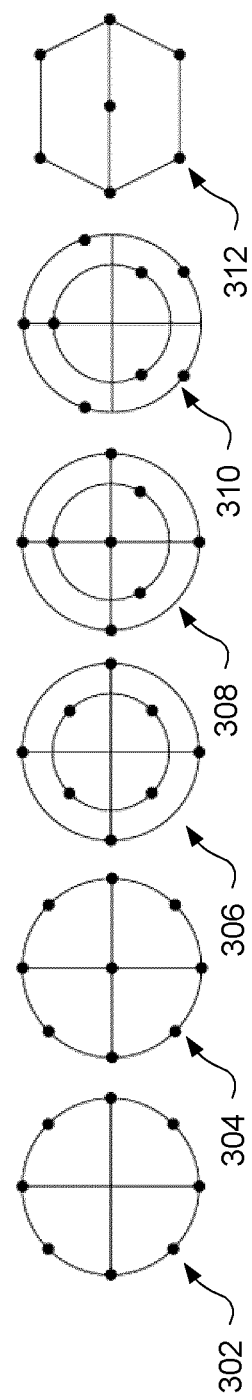
FIG. 3 shows representations of possible array configuration.

FIG. 3 shows alternative circular array antenna geometries of the leak detector. Beamforming is a method of spatially filtering radio or sound signals to aid in discriminating the location of the sound source. This is also known as directional selectivity. Linear arrays have excellent directivity and they have smaller side-lobes (desirable characteristic of an antenna) but performance over wider frequency ranges is inconsistent and they do not perform equally in all angular directions. For example geometry 302 shows an 8 element array, 304 an 8+1 element array, 306 a 4+4 element array, 308 4+3+1 element array, 310 a 5+3 element array and 312 a 6+1 element array. The number of elements may be modified depending on the desired frequency and processing power. The radius of the array plays a major role in performance and the elements should be uniformly distributed around the perimeter of the ring. A central element improves the throughput performance of the array and the number of rings may be adjusted to optimize antenna performance.

To avoid spatial aliasing effects, the distance between adjacent microphones, "d", must be smaller than half the minimum wavelength of the signal being detected, as determined by the formula:

$$d \le \frac{\lambda_{min}}{2}$$

From this we can roughly assess the array geometry. For example, the wavelength of a 42 kHz signal is given by the formula:

$$\lambda = \frac{\text{speed of sound (air 20° C.)}}{\text{frequency}} = \frac{343.2}{42000} = 0.0082 \text{ m} = 8.2 \text{ mm}$$

The required maximum microphone spacing "d" would be 4.1 mm in this example.

Time Difference of Arrival (TDOA) is considered highly accurate when pairs of sensors are utilized and Line of Sight (LOS) from transmitter to receiver is available. Utilizing the GPS or accelerometer of the handheld mobile device may be used to improve location determination.

Time of Arrival (TOA)/TDOA algorithms such as a Linear Intersection (LI) method for calculating a number of potential source locations from the points of closest intersection for all pairs of bearing lines and use a weighted average of these locations for a final estimate can be utilized.

An acoustic source tracking algorithm may be utilized using Eigenbeams, which are vectors defining azimuth and elevation to the source. Eigenbeams won't identify the distance to the source unless there are 2 or more vectors that are spatially separate. Multiple vectors pointing generally at the same source may be used to "triangulate" more accurately on that source.

Figure 4:
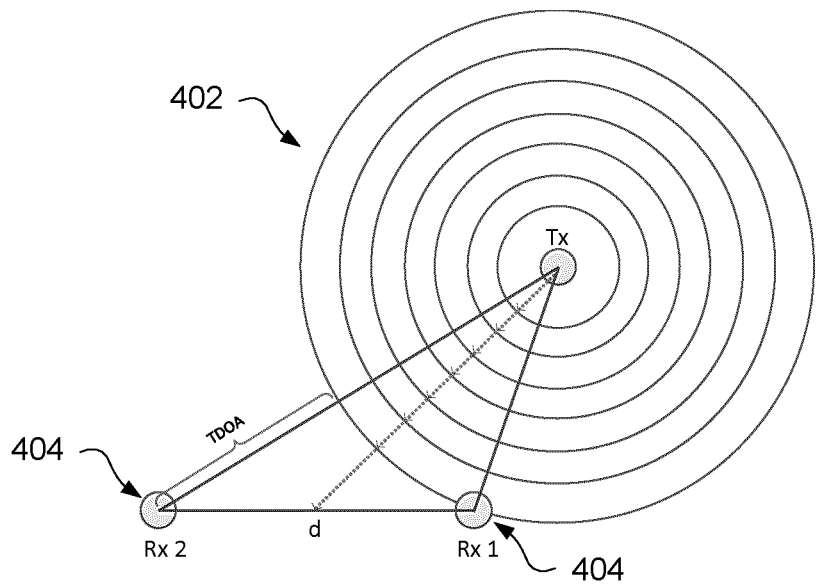
FIG. 4 shows a representation of 2D near-field geometry.

The Direction of Arrival Estimation (DOAE) for an acoustic signal may be determined with as few as three omnidirectional microphones using Time Difference of Arrival (TDOA) methods. As shown in FIG. 4, sound emanates from source Tx as a spherical wave pattern 402 where each wave propagates at the same speed towards receivers Rx1 and Rx2 404. The receivers sense the sound at different times due to differing propagation delays and the TDOA between the receivers is used to determine the direction to the source. A spherical/circular pattern is created when the transmitter and receivers are positioned nearby. This is known as the Near-Field scenario. Near-field effects make certain communication methods possible, such as the Near Field Communication (NFC) mode available with most handheld devices. Localization calculations within the near-field are complex and processor intensive.

Figure 5:
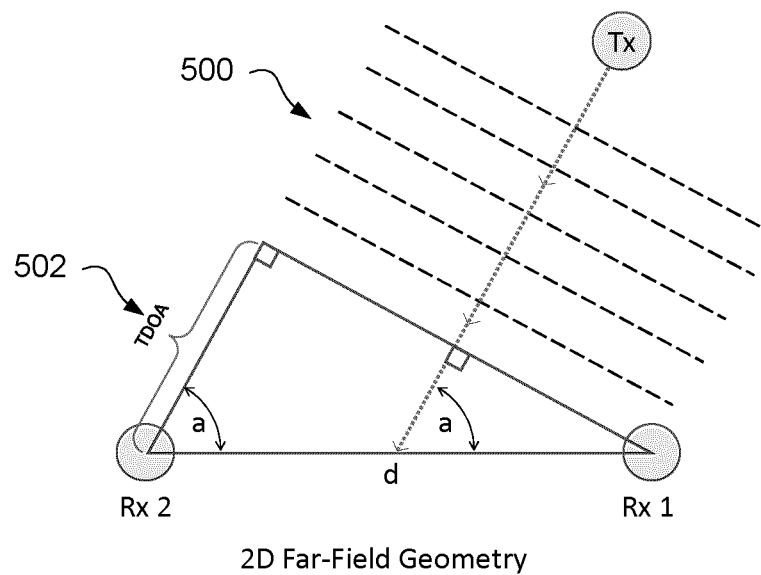
FIG. 5 shows a representation of 2D far-field geometry.
Figure 6:
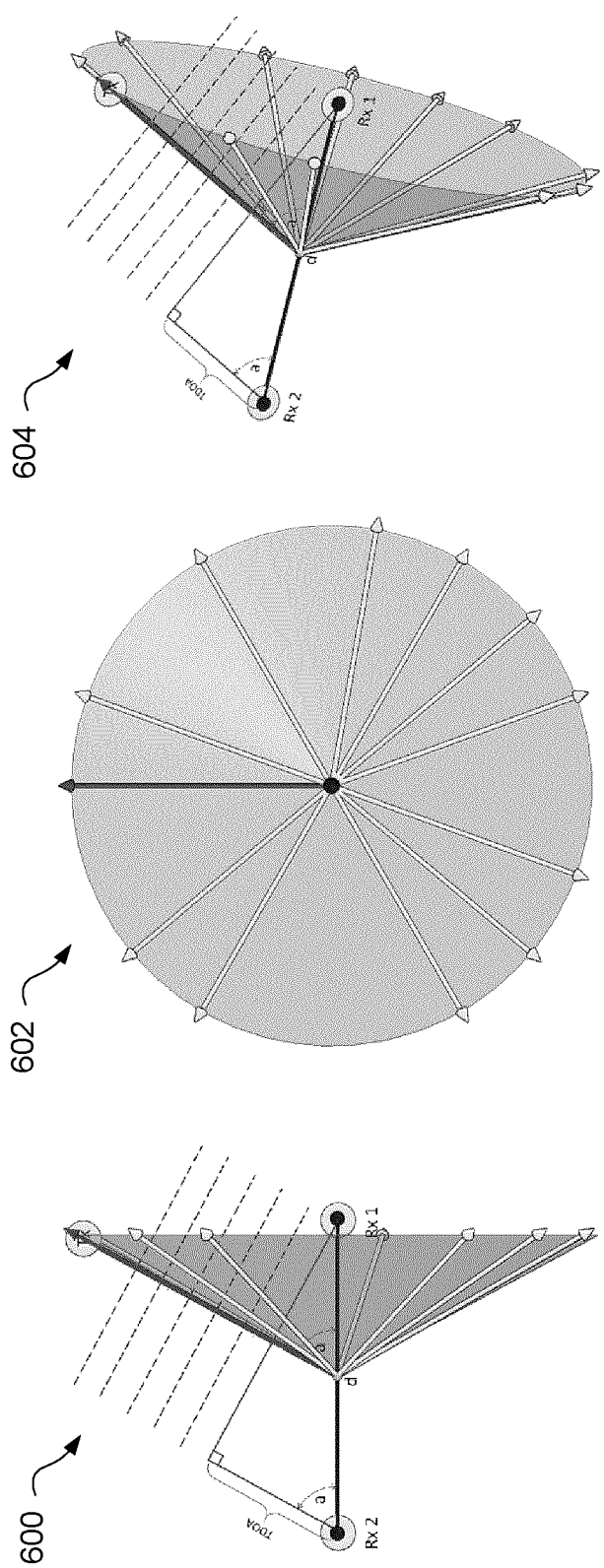
FIG. 6 shows a representation of 3D far-field direction of arrival problem.

In contrast, the Far-Field scenario separates the transmitter and receivers by much greater distances. In this case the spherical waves may be reasonably represented by planes 500 as shown in FIG. 5, which greatly simplifies the analysis. Now the math may be performed using a simple shape, the right triangle 502.

Definitions of both near and far field vary but an acceptable definition of far-field is starting at a distance of 2 wavelengths away from the sound source, and extends outward to infinity. Therefore within 2 wavelengths we are in the near-field region.

As noted earlier, the wavelength of a 42 kHz sound source is 8.2 mm. At the low end of the spectrum of interest (26 kHz) the wavelength is 13.2 mm. Whereas the intent is to identify the source of a leak from several meters away and progressively close the distance to the source to within 30 cm for Sound Pressure Level (SPL) measurement, we may consider our analysis for the far-field scenario only and so disregard the near-field. The theory shows that Angle of Arrival (AOA=a) from the midpoint between two receivers to the source may be determined directly from the TDOA measurement, as that time value may be converted to a distance by multiplying by the speed of sound (343.2 m/s). This determines the lengths of all three sides of a right triangle and the associated AOA (a) follows from that. This works perfectly in the 2D scenario of FIG. 5 but fails in 3D because there are an infinite number of points around receivers Rx1 & Rx2 that will satisfy the geometrical constraints. In fact, the solution to the problem in 3D space is a cone/circle where every point on the circle is equidistant to the mid-point between the two receivers as demonstrated in the series of images in FIG. 6. This shows three different views (side 600/front 602/isometric 604) with several potential direction vectors in yellow, each with an equal TDOA.

To solve this, additional receivers are required. In one scenario, an additional receiver can be added to the mix and any two different pairings of those three could be used to determine two cones of potential direction vectors. The intersection of the cones is a parabolic approximation to the Direction of Arrival (DOA) but additional processing is necessary to make that DOA determination accurately.

Figure 7:
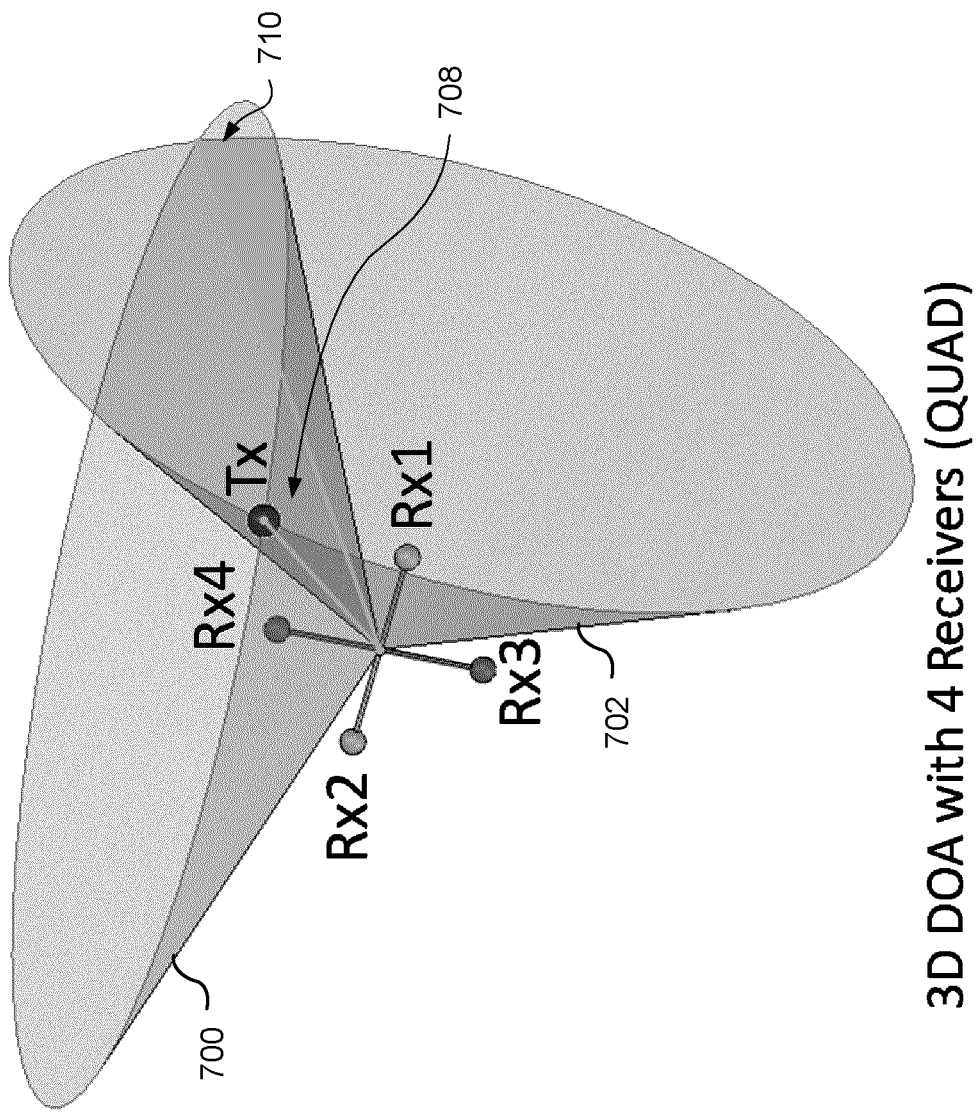
FIG. 7 shows representation of 3D DOA with 4 receivers.

Another solution is with two pairs of receivers (4 in total Rx1, Rx2, Rx3, Rx4) sharing a common plane and midpoint but at right angles as shown in FIG. 7 The DOA can be estimated by determining two intersecting cones 700 and 702 with a common apex and the intersection occurs as a pair of lines that are mirrored about the plane containing the receivers.

It would seem we are still unable to determine the correct DOA since we have a choice of two lines (actual DOA 708 and phantom DOA 710) but in practice one of the lines can be eliminated because the phantom line 710 is pointing behind the receivers and in this direction the receivers cannot detect a signal. The vector which is direction outward-normal to the receivers is known so this may be used to mathematically exclude the phantom, leaving the true DOA.

Figure 8:
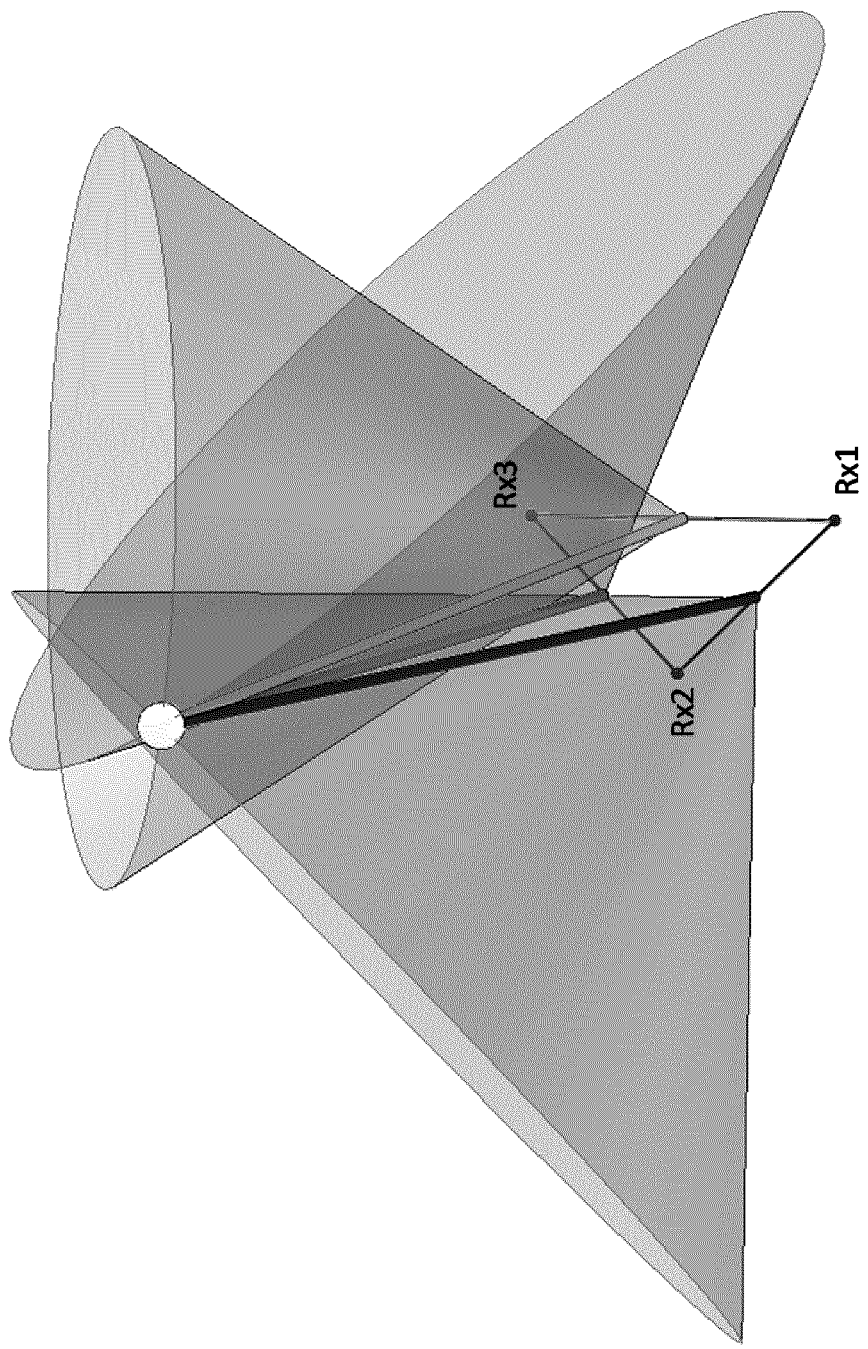
FIG. 8 shows 3D localization with 3 receivers.

As shown in FIG. 8, 3D localization may be completed with as few as 3 receivers using the far-field model. In this case there are three possible pairings: Rx1/Rx2, Rx1/Rx3 & Rx2/Rx3 so three DOA cones may be computed, the intersection of which determines a point in 3D space.

The solution to this problem involves solving 7 equations in 7 unknowns so this is once again a currently unviable, processor intensive exercise. However, by adding one more receiver at the center of the configuration in FIG. 6 we can represent the complex 3D problem as several, far simpler two-dimensional (2D) problems.

The preceding discussion about DOA and localization is based on the ability to determine the TDOA for an acoustic signal received by a pair of microphones (mic). This may be performed using well established numerical methods.

This technique sums an increasingly delayed version of the signal detected by sensor #1 with an un-delayed version of the signal as detected by sensor #2. Assuming the signal arrives at sensor #1 first, at some point the delayed and non-delayed signals will become in phase with their sum becoming a maximum. The associated sample delays may then be converted to time to determine the TDOA. This is a brute force, computationally intensive method that takes time and logic resources to complete, which would be considerable in a system with many sensors in an array.

Cross correlation performs the analysis required to determine the TDOA for a pair of mic signals more easily with the help of the Fast Fourier Transform (FFT). The steps are to convert each signal to the frequency domain by FFT, multiply the corresponding frequency amplitudes together and convert that back to the time domain with an Inverse FFT (IFFT). The TDOA is then determined from the cross-correlated signal by determining where in the convolved data set a peak is detected. Environmental noise and reverberation can alter the true position of the peak or mask it entirely. The Generalized Cross Correlation (GCC) was developed to counter this issue. This works by applying weighting factors in the frequency domain to reduce the influence of problematic frequencies. Different weighting functions may be applied depending on the conditions.

It is worth noting at this point that some form of conditioning in the frequency domain has already been anticipated. The host application (Android™/iOS™) will monitor the acoustic environment over space and (limited) time to identify frequency content that is considered noise so these frequencies may be adaptively filtered by the device. Utilizing a combination of space/time host determined frequency filters as well as standard weighting functions may produce superior results. Space/Time Adaptive Frequency Filtering will be a uniquely innovative and important feature.

Several potential sensor configurations have been presented, with each providing certain benefits related to computational ease, device construction and resulting accuracy. Each cluster includes unique features, but when considered as a system component which simply provides a vector and possibly distance to a source of ultrasonic sound, the various clusters share common attributes.

The number of similar clusters on the receiver face determines the angular spacing. Two (2) clusters would be the minimum in the case where the sensor configuration determines a vector as well as distance to the source. The maximum number of sensor clusters is determined by physical space and computational burden. Relevant factors include the diameter of the PCB as well as the form of the sensor element.

There will likely be many more applications but the attenuation of ultrasonic sound in air increases with frequency. At any rate the invention as proposed provides for such future development. With a cluster represented by a single vector originating at the center of the cluster, FIG. 9 represents conceivable configurations on the face of the receiver.

The diameter of the receiver may vary. For example:
Small: 1-4 cm with 2-3 clusters . . . receiver is installed in a fixed position as part of a distributed detection system or as a wearable device
Medium: 4-10 cm with 3-8 clusters . . . as part of a mobile application
Large: 10-20 cm or more with 9-16 or more clusters . . . also as part of a fixed system where mission critical performance is required.

Figure 9:
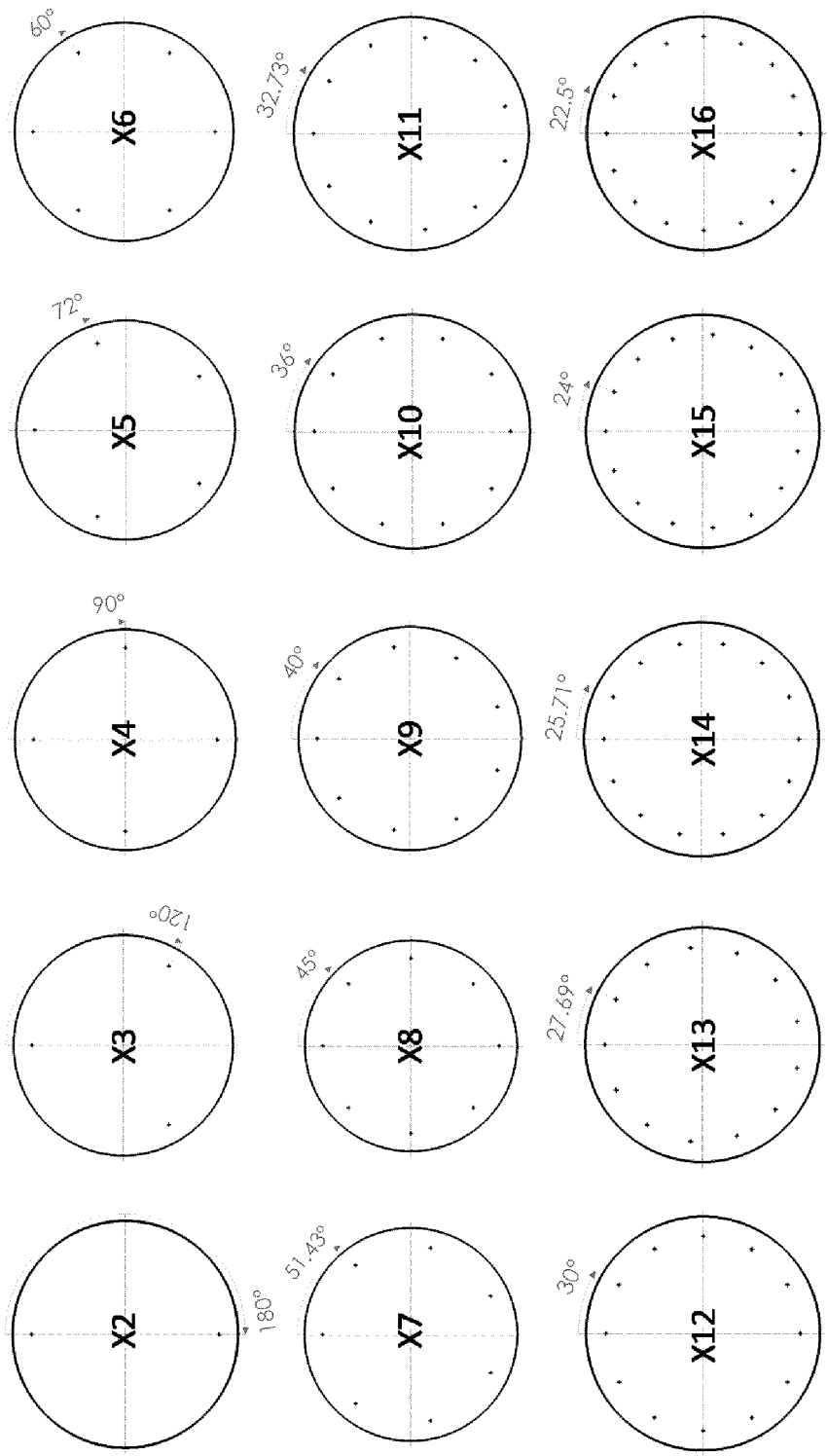
FIG. 9 shows representation of possible cluster distribution options on receiver face.

Performance of the device is optimal when each of the clusters is located furthest from the center of the PCB but this patent also covers less efficient configurations where, for example, a cluster may be located in the center or anywhere else inside the cluster center rings indicated in FIG. 9.

Uniform Circular Array (UCA) configuration provide the simplest arrangement from a computational perspective, but it provides the least amount of detail. This method is implemented in voice-based detection systems, which are now common in the market. The solution at ultrasonic frequencies is a direct application of the now well-developed theory. However, none of these systems would be suitable for ultrasonic source detection due to spatial aliasing effects (insufficiently close sensors) as well as limitations on the sensors, which do not have suitable ultrasonic frequency response. In this configuration the device each cluster may utilize 6, 7, 8 or more sensors in each cluster with element spacing determined for the maximum target frequency. Example configurations with the maximum frequency to approximately determine direction are shown in FIGS. 10 to 12.

Figure 10:
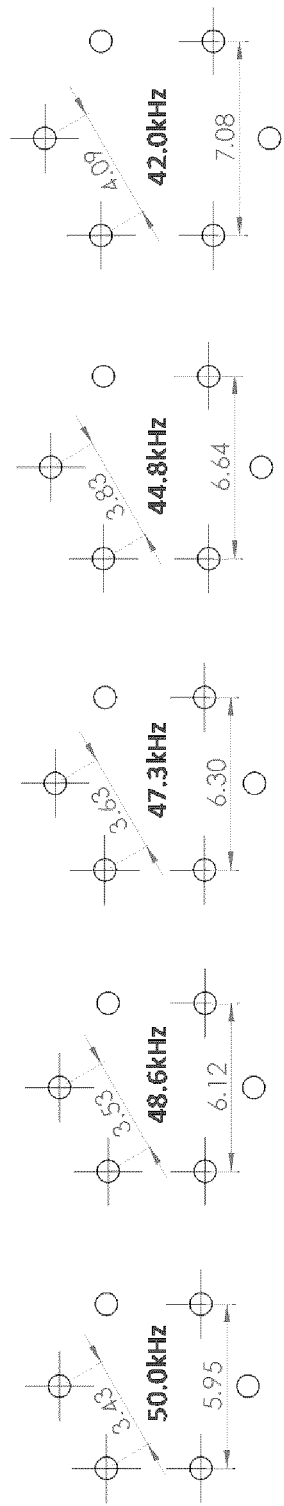
FIGS. 10-12 show examples of uniform circular array (UCA) configurations.

FIG. 10 is an example of UCA6: 6 elements with an equal distance from the center of the cluster to each element and between adjacent elements.

Figure 11:
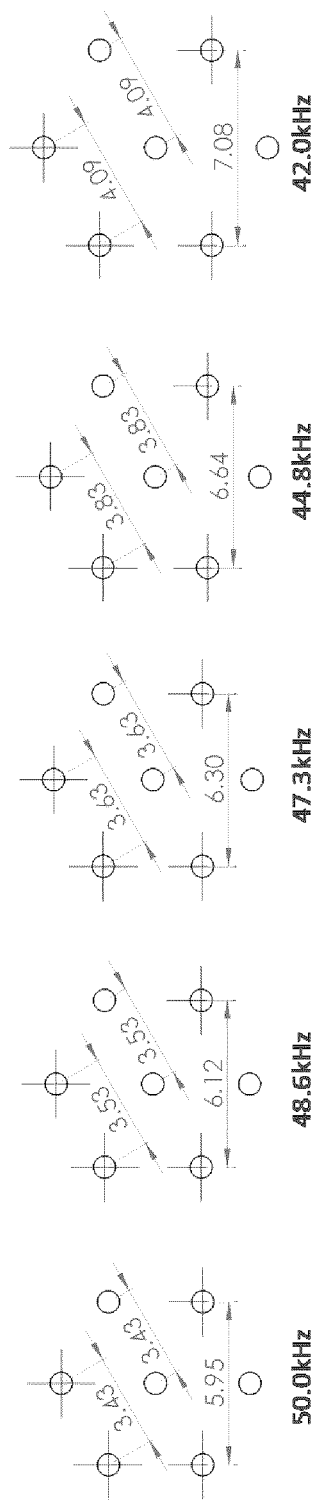

FIG. 11 is an example of UCA7: as for UCA6 but with an additional element at the center of the cluster.

Figure 12:
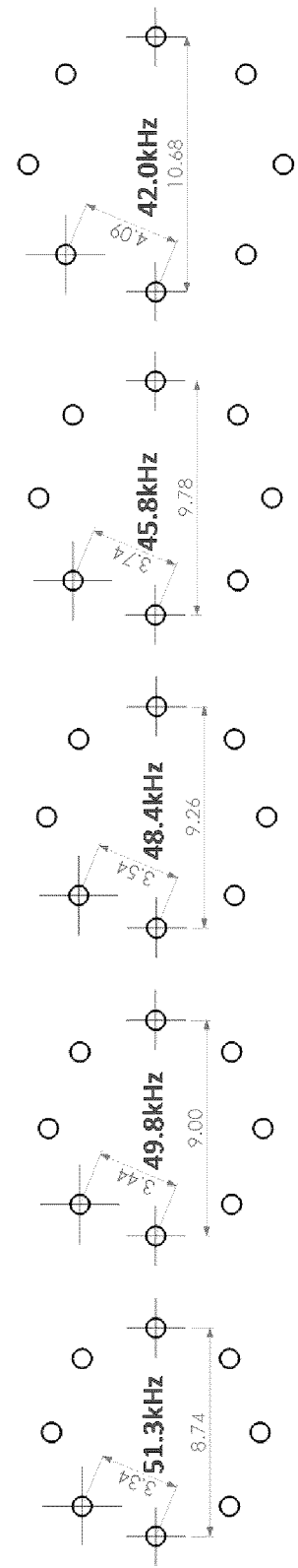

FIG. 12 is an example of UCA8: 8 elements with an equal distance from the center of the cluster to each element and radially spaced by 45° round the center.

Figure 13:
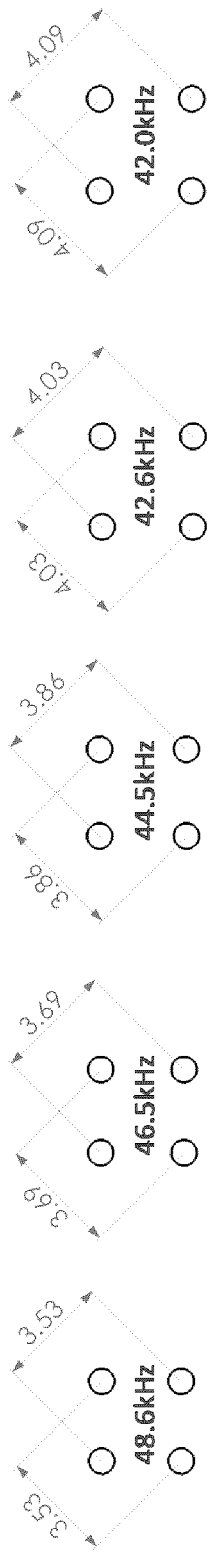
FIG. 13 shows a Quadrant Array receiver arrangement.

A quadrant array (QUAD) configuration, as referenced in FIG. 13 will use the principle of radial symmetry along with multiple QUAD clusters to determine a better approximation of the direction to the source. The computational effort increases in this case over the UCA method, but the improved performance makes it worth the expense. This configuration provides for more closely spaced sensors and improved performance at higher frequencies. Example QUAD configurations with the maximum frequency to reliably determine direction are shown in the series of images of FIG. 13.

The QUAD cluster has the limitation of not directly determining distance to the source. However, with multiple QUAD clusters at different locations on the face of the receiver, we may calculate the least squares error approximation to the point of intersection for multiple direction vectors to determine an estimate of distance computationally. There is also a variant of the QUAD configuration that directly provides the distance to source. By locating an additional sensor at the center of the QUAD cluster a complex mathematical problem may be reduced in complexity.

Placing a sensor at the center of the center of the QUAD assembly is impractical though since the sensors are already as close together as possible. Putting one in the middle will separate the aperture's and reduce the maximum operating frequency, which defeats the intent of the enhancement, of course there is also the use of a range sensor to directly measure distance to the target identifying the source.

Options for determining the distance to the source, which is known as 3D localization can also be determined. Using computationally intensive methods, it is possible to determine localization information with as few as 3 non-collinear elements. However, a triad such as this provides little benefit over the QUAD configuration due to sensor spacing restrictions. In fact, the triad configuration of FIG. 8 may be obtained from an existing QUAD configuration by simply ignoring the 4th sensor. The triad will perform at the same maximum frequency as the QUAD (~48 kHz) and it will determine distance to the source, but it does so with considerable processing burden. This configuration will provide for more compact solutions with fewer sensor elements when processing technology is up for the task but it is not practical at this time. Each of the sensor configurations discussed earlier has an associated maximum frequency that is dependant on one factor, the distance between paired sensor apertures.

Figure 14:
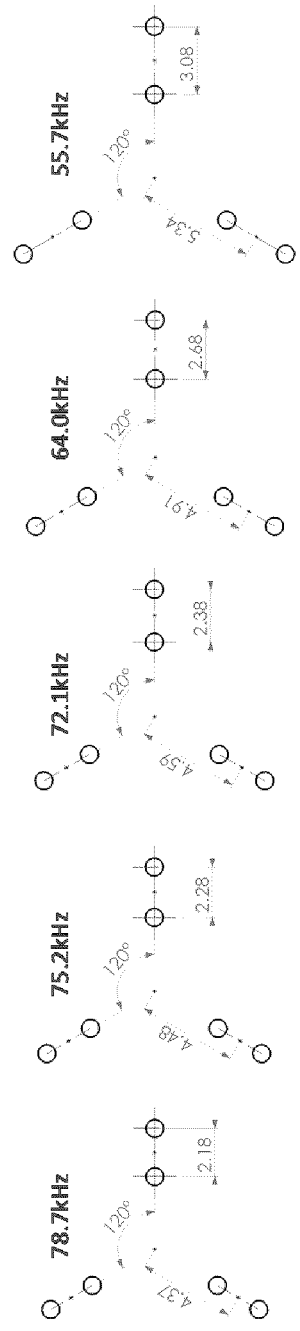
FIG. 14 shows a Triad Pair Array receiver arrangement.

The triad array configuration of FIG. 8 generates 3 direction of arrival (DOA) cones using the 3 possible sensor pairings: Rx1/Rx2, Rx1/Rx3 & Rx2/Rx3 but the direction of the resulting vectors are all very similar in value due to the array geometry. If the 3 pairs of sensors were more widely spaced on the receiver face it should be possible to provide better discrimination for the intersection of the three cones. The 2-sensor arrangement determines a single cone with no ability to pair with any other sensor so a total of 3, 2-sensor pairs would be needed to generate 3 DOA cones. Various configurations for the sensor pairs are shown in FIG. 14.

A tight pitch transducer array module, based on a broadband air-coupled transducer made by MicroAcoustic Instruments™ Inc, would permit much more closely spaced sensor elements and it would greatly simplify device construction and enable DOA determination at frequencies well above 50 kHz.

Advanced materials may be utilized to improve the sensitivity and frequency response of ultrasonic sensor. Graphene, which in its purest form is a single atom layer thick sheet of carbon molecules, or Parylene may be utilized in the manufacture of a transducer. Vapor deposition techniques will allow the fabrication of tightly spaced sensor arrays with elements having spacing of just 2 mm to 3 mm, which is near the limit for existing digital MEMS microphones. Inter-element spacing could be reduced further using this technique to provide 5 microphone clusters of the type described in the discussion of 3D Localization or the 6+1 configuration.

An array of sensors previously described along with fast switching logic may be utilized to sample many sensor elements using common electronic resources. For example: Consider a configuration of 25 sensors sampled at ~3 Mhz. A circuit that reliably switches at 3 Mhz×25=75 Mhz could sample all 25 sensor elements at a high enough rate to satisfy requirements. A modified sampling system would be utilized instead of 2 interleaved channels for left/right audio.

Figure 15:
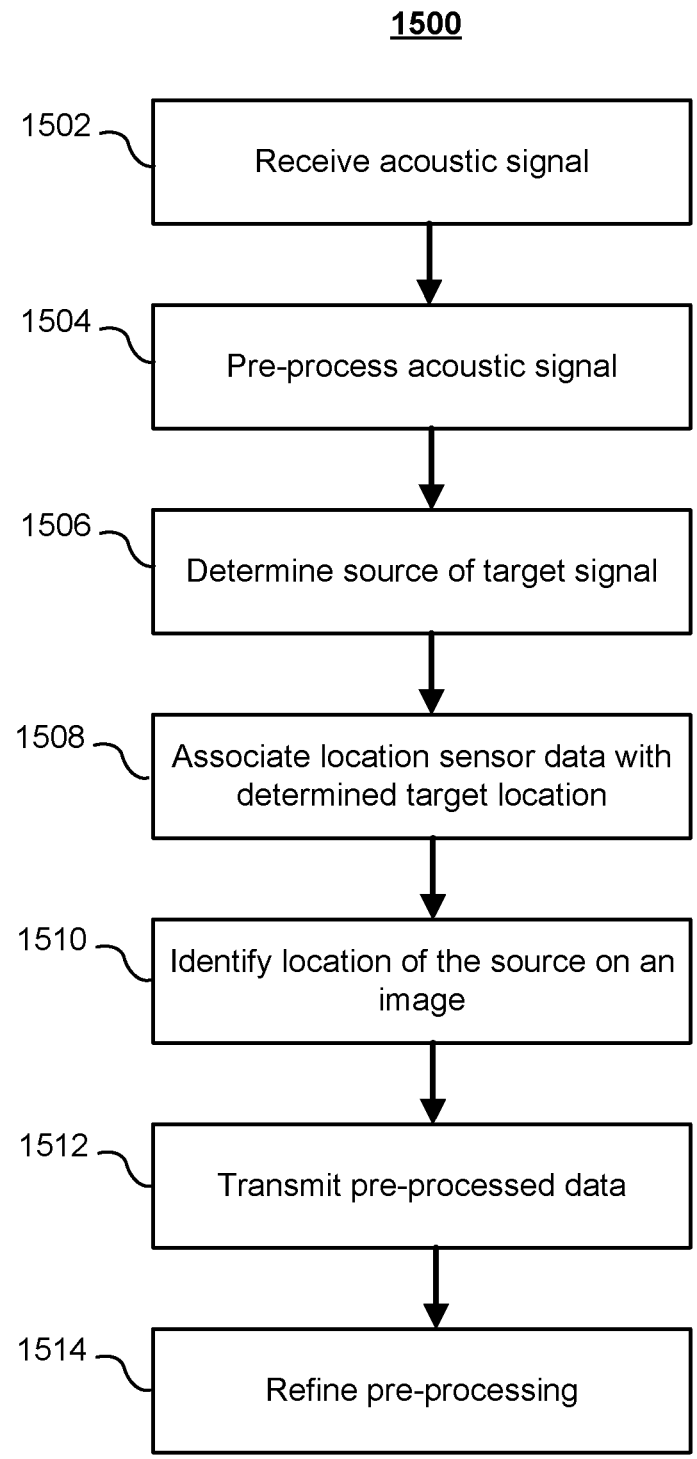
FIG. 15 shows a method of processing acoustic signals.

FIG. 15 depicts a method 1500 of operation of an ultrasonic leak detector. The ultrasonic leak detector receives an acoustic signal (1502) from a target sound source such as a gas leak or corona discharge. The received signal is pre-processed (1504) to correlate the input signals from the multiple transducers and to determine best estimates of direction and distance to the sound source relative to the receiver face. The pre-processed signal is provided to a mobile device through a wired or wireless communication link. The pre-processed signal may include sensor data obtained by the ultrasonic detection to aid in location discrimination on the mobile device so the mobile device may then determine where the sound source is in true space (1506). A peak source intensity can be identified by providing visual indicators to the user on the display of the mobile device to aid in the triangulation process. The indicators identify that the detector is "on-target" or "off-target" based upon an identified peak intensity and location of the source. The data may be provided to a remote processing system for additional analysis. The determined source is associated with position sensor data (1508) to aid in the identification of the location of the source (1510) in an augmented reality display on the mobile device. The collected data can then be transmitted through a network (1512) for storage or further processing such as refining the pre-processing algorithms (1514). The collected data may also be used later to perform comparisons in the example of machines or industrial motor performance analysis. The source can also be characterized in intensity Sound Pressure Level (SPL) and mass-flow.

Each element in the embodiments of the present disclosure may be implemented as hardware, software/program, or any combination thereof. Software code, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, ora magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-16 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. An ultrasonic leak detector comprising:
a body comprising:
   a first surface for coupling to a mobile device;
   a second planar surface directed away from the mobile device;
   a plurality of ultrasonic arrays provided on the second planar surface each associated with a plurality of equidistant openings, each of the plurality of openings spaced equidistant apart by a distance (D)≤½ wavelength of the maximum discernible frequency of the detector;
   a processor for receiving an ultrasonic acoustic signal from each of the plurality of ultrasonic arrays and pre-processing the received ultrasonic acoustic signals from each of the plurality of ultrasonic arrays to determine a direction vector from the times of arrival (TOA) and time differences of arrival (TDOA) for each of the received ultrasonic signals from each of the plurality of ultrasonic arrays; and
   an interface for providing pre-processed signals from the ultrasonic detector to the mobile device for further processing on the mobile device to triangulate the direction vector and distance to a source of a leak from the individual direction vectors determined by the plurality of ultrasonic arrays.

2. The ultrasonic detector of claim 1 wherein for each of the plurality of arrays the processor determines an azimuth and elevation of a source.

3. The ultrasonic detector of claim 1 wherein the processor performs frequency analysis, noise filtering, sound pressure level and mass flow determination on the received ultrasonic acoustic signal.

4. The ultrasonic detector of claim 1 wherein the source is associated with a corona discharge.

5. The ultrasonic detector of claim 1 wherein each array comprises a plurality of ultrasonic transducers.

6. The ultrasonic detector of claim 5 wherein the plurality of ultrasonic transducers are arranged in a uniform circular array.

7. The ultrasonic detector of claim 6 wherein there is at least provided three arrays for the plurality of arrays and three transducers for the plurality of ultrasonic transducers.

8. The ultrasonic detector of claim 7 wherein a location is determined by triangulating location vectors from each of the plurality of arrays.

9. A method of ultrasonic acoustic leak detection, the method comprising:
receiving a plurality of ultrasonic acoustic signals at a plurality of arrays of an ultrasonic detector each of the plurality of arrays spaced equidistant apart by a distance (D)≤½ wavelength of the maximum discernable frequency of the ultrasonic detector;
pre-processing the plurality of ultrasonic acoustic signals by one or more processors of the ultrasonic detector received plurality of ultrasonic acoustic signals from each of the plurality of ultrasonic arrays to determine a plurality of direction vectors from the times of arrival (TOA) and time differences of arrival (TDOA) for each of the received ultrasonic signals from each of the plurality of ultrasonic arrays; and
transmitting the pre-processed acoustic signals to a mobile device;
wherein the plurality of direction vectors from the plurality of ultrasonic arrays are triangulated to determine a composite direction vector and the distance and sensor data of the mobile device associated with the determined location and a location of the source is identified on a display of the mobile device.

10. The method of claim 9 wherein the plurality of arrays of the ultrasonic detector comprises at least three arrays.

11. The method of claim 9 wherein a Linear Intersection (LI) is calculated for a number of potential source locations from points of closest intersection for all pairs of bearing lines and uses a weighted average of these locations for a final location estimate.

12. The method of claim 9 wherein for each of the plurality of arrays, vectors are determined defining an azimuth and an elevation to the source.

13. The method of claim 9 further comprising determining a Sound Pressure Level (SPL) and mass-flow rate associated with the source.

14. The method of claim 9 wherein each of the plurality of arrays comprises plurality of ultrasonic transducers.

15. The method of claim 14 wherein the plurality of arrays and the plurality of ultrasonic transducers are arranged in a uniform circular array.

16. The method of claim 15 wherein each uniform circular array comprises at least three ultrasonic transducers.

17. A non-transitory computer readable memory containing instructions for ultrasonic leak detection, the instructions which when executed by a processor perform the method comprising:
receiving a plurality of ultrasonic acoustic signals at a plurality of arrays of an ultrasonic detector each of the plurality of arrays spaced equidistant apart by a distance (D)≤½ wavelength of the maximum discernable frequency of the ultrasonic detector;
pre-processing the plurality of ultrasonic acoustic signals by one or more processors of the ultrasonic detector received plurality of ultrasonic acoustic signals from each of the plurality of ultrasonic arrays to determine a plurality of direction vectors from the times of arrival (TOA) and time differences of arrival (TDOA) for each of the received ultrasonic signals from each of the plurality of ultrasonic arrays; and transmitting the pre-processed acoustic signals to a mobile device;

wherein the plurality of direction vectors from the plurality of ultrasonic arrays are triangulated to determine a composite direction vector and the distance and sensor data of the mobile device associated with the determined location and a location of the source is identified on a display of the mobile device.

* * * * *